US007615591B2

(12) United States Patent
Matsui

(10) Patent No.: US 7,615,591 B2
(45) Date of Patent: Nov. 10, 2009

(54) RUBBER COMPOSITION, METHOD OF PRODUCING THE SAME AND TIRE USING THE SAME

(75) Inventor: Hideki Matsui, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/047,696

(22) Filed: Feb. 2, 2005

(65) Prior Publication Data

US 2005/0215697 A1 Sep. 29, 2005

(30) Foreign Application Priority Data

Feb. 2, 2004 (JP) ............................. 2004-025614

(51) Int. Cl.
*C08L 1/00* (2006.01)
*C08K 3/00* (2006.01)
*C08K 5/04* (2006.01)
*B60C 1/00* (2006.01)

(52) U.S. Cl. ..................... 524/493; 524/81; 524/491; 524/492; 524/571; 524/426; 524/425; 524/444; 524/490; 524/520; 524/413; 525/199; 525/236; 525/237; 525/232; 525/320; 152/209.5; 152/209.1; 152/905

(58) Field of Classification Search ................. 524/700, 524/493, 492, 413, 571; 525/199, 232, 236, 525/237, 320; 152/209.1, 209.5
See application file for complete search history.

(56) References Cited

U.S. PATENT DOCUMENTS

| | | | | |
|---|---|---|---|---|
| 3,769,256 A | * | 10/1973 | Yoshimoto et al | ............ 524/493 |
| 4,499,228 A | * | 2/1985 | Ogawa et al. | ................ 524/413 |
| 4,649,005 A | * | 3/1987 | Kobayashi et al. | ........... 264/101 |
| 5,804,644 A | * | 9/1998 | Nakafutami et al. | ......... 524/572 |
| 5,896,904 A | | 4/1999 | Ozaki et al. | |
| 6,035,911 A | * | 3/2000 | Matsumoto et al. | ....... 152/209.5 |
| 6,057,397 A | * | 5/2000 | Takagishi et al. | ............ 524/492 |
| 6,136,897 A | | 10/2000 | Kaufman | |
| 6,759,456 B2 | * | 7/2004 | Kikuchi | ........................ 524/81 |
| 2003/0004249 A1 | * | 1/2003 | Yagi et al. | .................... 524/442 |
| 2003/0114577 A1 | * | 6/2003 | Yatsuyanagi et al. | ......... 524/495 |
| 2005/0080199 A1 | * | 4/2005 | Kitahara | ................... 525/331.9 |

FOREIGN PATENT DOCUMENTS

| | | |
|---|---|---|
| EP | 0 697 432 A1 | 2/1996 |
| EP | 1 219 676 A1 | 7/2002 |
| EP | 1 225 200 A2 | 7/2002 |
| EP | 1323775 A1 * | 2/2003 |
| EP | 1 323 775 A1 | 7/2003 |
| EP | 1323775 A1 * | 7/2003 |

OTHER PUBLICATIONS

Patent Abstracts of Japan, vol. 199, No. 814, Dec. 31, 1998 corresponding to JP 10-251454.

* cited by examiner

*Primary Examiner*—Duane Smith
*Assistant Examiner*—Ives Wu
(74) *Attorney, Agent, or Firm*—Sughrue Mion, PLLC

(57) ABSTRACT

A rubber composition comprises a diene rubber component, a filler and a softening agent, in which a given amount of a filler is compounded based on 100 parts by mass of a diene rubber component, and a softening agent is included in a given amount per the filler, and not less than 60% by mass of the diene rubber component is a solution-polymerized styrene-butadiene copolymer rubber having a mass average molecular weight of not less than 1,000,000, and the filler is selected from the group consisting of carbon black, silica and an inorganic agent of a formula (I): $mM.xSiO_y.zH_2O$ (wherein M is at least one metal selected from the group consisting of aluminum, magnesium, titanium and calcium, or an oxide of such a metal or a hydroxide of such a metal, m is a number of 1-5, x is a number of 0-10, y is a number of 2-5 and z is a number of 0-10), wherein each of the filler and the softening agent is charged in at least two fractions.

10 Claims, No Drawings

RUBBER COMPOSITION, METHOD OF PRODUCING THE SAME AND TIRE USING THE SAME

BACKGROUND OF THE INVENTION

1. Field of the Invention

This invention relates to a rubber composition comprising a diene rubber, a filler and a softening agent, and a tire using such a rubber composition and a method of producing the rubber composition, and more particularly to a rubber composition for tires suitable in high-speed running such as high-performance automobile tires, racing tires and the like.

2. Description of Related Art

In automobiles for racing, the speeding up is recently made as seen in the renewal of lap time because the improvement is conspicuous in view of engines, chassis and aerodynamic technology. Similarly, high performance and speeding up are proceeding in general passenger cars.

Performances required for each tire become severer with the high performance and speeding up of a vehicle body. Among them, the improvement of high-speed durability and the improvement of gripping property on a wet road surface (hereinafter referred to as wet gripping property) are very important in view of a safeness.

It is known that the wet gripping property is improved by compounding silica instead of carbon black widely and usually compounded in the rubber composition for the tire. In tires mainly used for the purpose of running at a high speed such as running on a circuit course or the like, there is disclosed a rubber composition containing not less than 100 parts by mass based on 100 parts by mass of a rubber component. For example, there is proposed a tread rubber composition for racing tire compounding 100-250 parts by mass in total of a filler inclusive of not less than 20 parts by mass of silica and 5-50 parts by mass of a factice for providing an excellent wet gripping property and coping with adhesion at a production step (see, for example, JP-A-10-152583).

Also, there is proposed a rubber composition comprising 5-30 parts by mass of aluminum hydroxide, 40-150 parts by mass of silica and 0-100 parts by mass of carbon black to a specified rubber component, provided that a total amount of silica and carbon black is 45-165 parts by mass, and 50-200 parts by mass of a softening agent for rubber and 3-20% by mass of a silane coupling agent to silica in order to establish the wet gripping property and the wear resistance (see, for example, JP-A-2000-159935).

SUMMARY OF THE INVENTION

However, the inventor has found that the above conventional rubber compositions do not sufficiently develop the wet gripping property and the like because the addition and control of the filler and softening agent are insufficient.

The invention is concerned with a rubber composition for tires particularly used in the running at a high speed and is to provide a rubber composition having excellent wet gripping property, wear resistance, durability and the like and a good processability.

According to the invention, there is the provision of a rubber composition comprising a diene rubber component, a filler and a softening agent, in which 100-350 parts by mass of a filler is compounded based on 100 parts by mass of a diene rubber component, and a softening agent is included in an amount of not less than 70% by mass per the filler, and not less than 60% by mass of the diene rubber component is a solution-polymerized styrene-butadiene copolymer rubber having a mass average molecular weight of not less than 1,000,000, and the filler is selected from the group consisting of 0-50 parts by mass of carbon black, 50-300 parts by mass of silica and 10-80 parts by mass of an inorganic agent represented by the following general formula (I):

$$mM \cdot xSiO_y \cdot zH_2O \tag{I}$$

(wherein M is at least one metal selected from the group consisting of aluminum, magnesium, titanium and calcium, or an oxide of such a metal or a hydroxide of such a metal, m is a number of 1-5, x is a number of 0-10, y is a number of 2-5 and z is a number of 0-10), wherein each of the filler and the softening agent is charged in at least two fractions when the diene rubber component is mixed with the filler and the softening agent. Further, the invention is concerned with a method of producing such a rubber composition as well as a tire using such a rubber composition.

As a result of various studies for achieving the above object, the invention is based on a knowledge that a compounding composition possessing high wet gripping property and durability can be provided in a good processability by using a specified solution-polymerized styrene-butadiene copolymer rubber (hereinafter abbreviated as SBR simply) as a rubber component and defining a compounding ratio of the softening agent to the filler and a compounding method thereof in case of compounding carbon black, silica and a given inorganic agent in high compounding parts by mass.

In the rubber composition according to the invention, 0-50 parts by mass of carbon black, 50-300 parts by mass of silica and 10-80 parts by mass of the inorganic agent of the formula (I) are compounded based on 100 parts by mass of a given diene rubber component, and a total compounding amount of carbon black, silica and the inorganic agent as a filler is within a range of 100-350 parts by mass.

The inventor has found that when the fillers such as silica and the inorganic agent are compounded in a high compounding ratio, the durability and wear resistance at a high speed can not be ensured sufficiently because silica and the like are low in the reinforcing property as compared with carbon black and further the ratio of the rubber component in the rubber composition is relatively lowered. Also, it is considered that it is difficult to compound a greater amount of the filler from a viewpoint of the processability as the rubber composition (see JP-A-10-152583).

Under the above knowledge, the inventor has prepared and examined various rubber compositions for developing excellent performances such as wet gripping property, durability and the like without deteriorating the processability. As a result, the inventor has found that not only the total amount of the fillers and the amount of the softening agent for rubber but also the compounding ratio thereof are important for ensuring the desired wet gripping property and the good processability. In addition, the inventor has found that since the rubber composition being generally large in the total amount of the filler and softening agent is very bad in the processability, the compounding method of the filler and softening agent is very important in order to provide the good processability and the characteristics of vulcanized rubber. As a result, the invention has been accomplished.

In the invention, the rubber composition is obtained by using the solution-polymerized SBR having a mass average molecular weight of not less than 1,000,000 as not less than 60% by mass of the diene rubber component and rendering the total amount of the softening agent into not less than 70% by mass per the total mass of the fillers compounded and charging each of the filler and the softening agent in at least two parts.

According to the invention, a relatively high ratio of the filler can be compounded without deteriorating the processability by controlling the compounding amounts of the filler and softening agent and the compounding method thereof in a given dien rubber component, and also the excellent wet gripping property, wear resistance and durability can be developed in the resulting rubber composition.

DETAILED DESCRIPTION OF THE INVENTION (1) Rubber Composition

The rubber composition comprises a given diene rubber component, fillers, softening agent and the like. It is excellent in the processability at the mixing, milling, extruding, shaping or the like and can develop the excellent wet gripping property, wear resistance and durability. Typically, it is a rubber composition for tires, particularly a rubber composition for a tire tread.

(2) Filler

The filler is selected from the group consisting of carbon black, silica and an inorganic agent represented by the following general formula (I):

$$mM.xSiO_y.zH_2O \qquad (I)$$

(wherein M is at least one metal selected from the group consisting of aluminum, magnesium, titanium and calcium, or an oxide of such a metal or a hydroxide of such a metal, m is a number of 1-5, x is a number of 0-10, y is a number of 2-5 and z is a number of 0-10).

As the filler, 0-50 parts by mass of carbon black, 50-300 parts by mass of silica and 10-80 parts by mass of the inorganic agent of the formula (I) can be compounded based on 100 parts by mass of the diene rubber component. The compounding amount of each of the fillers can be selected from a viewpoint of the improvement of wet gripping property, wear resistance, durability and the like.

The total amount of carbon black, silica and inorganic agent as the filler is within a range of 100-350 parts by mass, preferably 150-300 parts by mass. When the total amount is less than 100 parts by mass, the wet gripping property is insufficient, while when it exceeds 350 parts by mass, the wear resistance and durability are deteriorated.

Also, a filler(s) other than the above carbon black, silica and inorganic agent can be added as far as the performances of the rubber composition are not obstructed.

(2-1) Carbon Black

Carbon black (hereinafter abbreviated as C/B) comes up short in the wet gripping property as compared with silica or the inorganic agent but is good in the durability and the milling property, so that it is used within a range of 0-50 parts by mass, preferably 10-30 parts by mass.

In the invention, the processability of an uncured rubber is largely improved by applying the mixing method mentioned later, but the presence of C/B exponentially assists such an improvement. On the other hand, when the amount exceeds 50 parts by mass, the improving width of the processability in the uncured rubber is small and the contribution to the wet gripping property is also small.

Further, C/B is preferable to have a nitrogen adsorption specific surface area ($N_2SA$) of 70-250 $m^2/g$.

(2-2) Silica

The amount of silica based on 100 parts by mass of the diene rubber component is not less than 50 parts by mass in view of the wet gripping property, and not more than 300 parts by mass in view of the milling property, wear resistance and the like, and is preferably 100-250 parts by mass. When the amount is less than 50 parts by mass, the wet gripping property is insufficient, while when it exceeds 300 parts by mass, the processability, wear resistance and durability can not be ensured sufficiently.

It is preferable that silica has a CTAB (cetyltrimethyl ammonium bromide adsorption) of 100-300 $m^2/g$ or DBP (oil absorption) of 150-300 mL/100 g in view of the wet gripping property and durability.

(2-3) Inorganic Agent

The inorganic agent is represented by the formula (I) of $mM.xSiO_y.zH_2O$ (wherein M, m, x, y and z are the same meanings as mentioned above). The amount is 10-80 parts by mass, preferably 25-70 parts by mass based on 100 parts by mass of the diene rubber component. When it is less than 10 parts by mass, the wet gripping property is insufficient, while when it exceeds 80 parts by mass, the wear resistance, durability and the like are deteriorated.

As the inorganic agent, there can be used alumina ($Al_2O_3$), alumina hydrate ($Al_2O_3.H_2O$), aluminum hydroxide ($Al(OH)_3$), magnesium hydroxide ($Mg(OH)_2$), magnesium oxide (MgO), talc ($MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide ($Ca(OH)_2$), aluminum magnesium oxide ($MgO.Al_2O_3$), clay ($Al_2O_3.2SiO_2$), kaolin ($Al_2O_3.2SiO_2.2H_2O$), pyrophylite ($Al_2O_3.4SiO_2.H_2O$), bentonite ($Al_2O_3.4SiO_2.2H_2O$), aluminum silicate ($Al_2SiO_5$, $Al_4.3SiO_2.5H_2O$ or the like), magnesium silicate ($Mg_2SiO_4$, $MgSiO_3$ or the like), calcium silicate ($Ca_2SiO_4$ or the like), aluminum calcium silicate ($Al_2O_3.CaO.2SiO_2$ or the like), magnesium calcium silicate ($CaMgSiO_4$) and the like. These inorganic agents may be used alone or in a combination of two or more. Among them, alumina hydrate, aluminum hydroxide, kaolin and the like are preferable in a point that the improvement of the wet gripping property is large, and particularly at least one of alumina hydrate and aluminum hydroxide is preferable.

The inorganic agent is preferable to have an average particle size of 0.01-10 μm, further preferably 0.1-5 μm.

(3) Softening Agent

The amount of the softening agent in the rubber composition is not less than 70% by mass to the total mass of the filler (not less than 0.7 to the total mass of the filler), preferably not less than 80% by mass (not less than 0.8 to the total mass of the filler). When the ratio of the amount of the softening agent to the total mass of the filler is less than 0.7, the elastic modulus of rubber is high and the wet gripping property is poor, and further the dispersibility of the filler in the milling of rubber is largely deteriorated. Particularly, the deterioration in the dispersibility of the filler considerably obstruct the processability of the uncured rubber and does not stably provide the desired properties of the vulcanized rubber.

As the diene rubber component can be used commercially available ones. In this case, the diene rubber component itself may contain a softening agent. Therefore, the softening agent included in the diene rubber component is included in the total amount of the softening agent contained in the rubber composition. When the filler is charged in the milling, an additional softening agent is used.

The kind of the softening agent is not particularly limited as far as the softening agents for rubber usually and widely used in the field of the rubber composition. For example, there are paraffinic process oil, naphthenic process oil, aromatic process oil, special process oil and the like. In addition, a tackifying resin such as various natural resins and synthetic resins, a diene polymer having a mass average molecular weight of not more than 50000 or the like may be compounded as a softening agent.

(4) Diene Rubber Component

The diene rubber component contains not less than 60% by weight of solution-polymerized SBR having a mass average molecular weight of not less than 1,000,000. When the mass average molecular weight is less than 1,000,000, the wear resistance and the durability are not sufficient as the chipping of the block and the like are observed, and also there is a problem in the processability such as adhesion of the uncured rubber or the like. Particularly, the mass average molecular weight of not less than 1,500,000 is preferable. On the other hand, the mass average molecular weight of not more than 5,000,000 is preferable in view of the productivity and processability of the polymer itself.

The amount of the solution-polymerized SBR in the diene rubber component is not less than 60% by mass, preferably not less than 70% by mass. When the amount is less than 60% by mass, the durability is not sufficient. The bound styrene content is not particularly limited, but it is preferable within a range of 20-60% by mass.

The solution-polymerized SBR is obtained by copolymerizing with an organolithium polyfunctional initiator or by polymerizing with an organo-monolithium initiator and a polyfunctional monomer. In an anion polymerization using an organo-monolithium as an initiator, the molecular weight is increased by reacting a compound having a halogen atom of not less than two atoms to an active terminal after the polymerization. Furthermore, in case of using the organolithium polyfunctional initiator or the organo-monolithium initiator and the polyfunctional monomer, the molecular weight can be more increased by increasing the number of active terminals per one chain of the high polymer after the completion of the polymerization and conducting a coupling reaction, whereby a super-high molecular weight solution-polymerized SBR can be obtained.

The copolymerization of the super-high molecular weight solution-polymerized SBR is carried out by a solution polymerization method using an aliphatic hydrocarbon such as n-hexane, n-heptane or the like, or an aromatic hydrocarbon such as toluene, benzene or the like, or an alicyclic hydrocarbon such as cyclohexane or the like as a solvent in the presence of a specified organolithium initiator.

As the organolithium initiator can be used an organo-monolithium initiator such as n-butyllithium, sec-butyllithium or the like, or an organolithium polyfunctional initiator such as tetramethylene-1,4-dilithium, hexamethylene-1,6-dilithium, 1,3-dilithiobenzene, 1,4-dilithiobenzene, octamethylene-1,8-dilithium, 1,4-dilithiocyclohexane or the like. Furthermore, a polyfunctional monomer such as divinylbenzene, diisopropylbenzene or the like may be added before or in the polymerization.

In the copolymerization of the super-high solution-polymerized SBR, it is preferable to use a polar compound such as a tertiary amine compound, an ether compound or the like as a randomizing agent for styrene in the polymerization.

In the production of the solution-polymerized SBR, the coupling after the completion of the polymerization can be carried out by using a silane compound represented by the following formula (II):

$$SiR_pX_q \quad (II)$$

(wherein X is a chlorine atom, a bromine atom or an iodine atom, and R is a substituent selected from the group consisting of an alkyl group, an alkenyl group, a cycloalkyl group and an aryl group, and p is a number of 0-2 and q is a number of 2-4 provided that p+q=4). In this case, a component having a higher molecular weight is obtained, which can improve the wear resistance/durability.

As the silane compound of the formula (II), mention may be made of tetrachlorosilane, tetrabromosilane, methyl trichlorosilane, butyl trichlorosilane, octyl trichlorosilane, dimethyl dichlorosilane, dimethyl dibromosilane, diethyl dichlorosilane, dibutyl dichlorosilane, dibutyl dibromosilane, dioctyl dichlorosilane, dipheyl dichlorosilane, diacryl dichlorosilane, phenyl trichlorosilane, phenyl tribromosilane and the like.

(5) Silane Coupling Agent

In the compounding of silica, it is preferable to use a silane coupling agent. By the application of the silane coupling agent are improved not only the operability in the rubber milling and the dispersibility of silica but also the wear resistance and cut resistance based on the strengthening of a bond between silica and rubber in the vulcanized rubber.

As the silane coupling agent, bis(3-triethoxysilylpropyl)tetrasulfide, bis(2-triethoxyethyl)tetrasulfide and the like are preferable. The amount of the silane coupling agent compounded is preferably 5-20% by mass to the amount of silica compounded.

(6) Other Additives

In the rubber composition may be properly compounded the other additives usually used in the rubber industry such as zinc oxide, stearic acid, antioxidant, wax, vulcanizing agent and the like without damaging the effects of the invention.

(7) Charging of Filler and Softening Agent in Divided Fractions

The rubber composition can be obtained by milling the diene rubber component, the filler, the softening agent and the like in a milling machine such as Banbury mixer, inter mixer, rolls or the like. In the mixing of the diene rubber component with the filler and softening agent, each of the filler and softening agent is charged in at least two fractions. By charging the filler and the softening agent in such divided fractions is realized the good processability, and it is possible to produce a rubber composition having a relatively high filling ratio of the filler, and the properties after the processing such as wet gripping property and the like are considerably improved.

In order to stably obtain desired rubber properties of the rubber composition, the dispersibility of the filler and softening agent compounded in higher parts by mass is very important. When the filler and softening agent are charged at once simultaneously or separately, rubber is adhered to an interior of the milling machine or the cohesiveness of rubber taken out from the milling machine is poor, and hence the processability of the uncured rubber is very poor. In addition, the desired rubber properties are not stably obtained due to the deterioration of the dispersibility of the filler and softening agent and the like. In the invention, therefore, the filler and the softening agent are charged in tow or more fractions, respectively.

The filler and the softening agent may be separately charged and milled in the diene rubber component. Preferably, the filler and the softening agent are charged in the diene rubber component together and milled simultaneously. In this case, each of the filler and the softening agent may be charged in two or more fractions and thereafter milled.

The number of divided fractions and ratio thereof are not particularly limited as far as the filler and the softening agent may be compounded in higher parts by mass without causing the problem in the dispersibility. They may be properly selected in accordance with the total amount of the additives, total amount of the fillers, total amount of the softening agent, kind of the milling machine, capacity of the milling machine and the like.

In the charging of the filler and the softening agent in fractions, a previous charging amount of each of the filler and the softening agent can be made larger than a subsequent charging amount thereof.

That is, not less than ½ of the total compounding amount of the filler and not less than ½ of the total compounding amount of the softening agent can be charged at a first stage. In this case, the charging amounts of the filler and the softening agent at the first stage are 50-90% by mass of the total compounding amount of the filler and 50-90% by mass of the total compounding amount of the softening agent, respectively.

In the charging of each of the filler and the softening agent in divided fractions, it is preferable that the major part of the total compounding amount is charged at the first stage and the minor part thereof is charged at subsequent stages.

When the charging number of each of the filler and the softening agent is 2, the divided fraction ratio is 5:5-9:1, preferably 6:4-8:2. When the charging number is 3, it is preferable that the charging amount is 50-80% by mass at a first stage, 10-40% by mass at a second stage and 5-25% by mass at a third stage. In case that the charging number is 3, the divided fraction ratio is 5:3:2-8:1:1, preferably 5:4:1-8:1:1. For example, the divided fraction ratio is preferable to be 7:3 in the two division and 6:3:1 in 3 division.

As usual, the formation of the rubber composition can be divided into [1] a master batch compounding step of milling the polymer, the filler, the softening agent and the like and [2] a finish compounding step of milling with sulfur, a vulcanization accelerator(s) and the like. The charging of the filler and the softening agent in divided fractions can be preferably carried out in the master batch compounding step.

As the charging method of divided fillers and softening agents, there are considered (a) a method wherein the filler and the like are charged in plural fractions at the single master batch compounding step and (b) a method wherein the master batch is divided into plural parts and each fraction of the filler and the like is charged into each of these parts. Both the methods may be adopted.

(8) Tire

The rubber composition according to the invention is applicable to tires such as pneumatic tires and the like. Particularly, it can be applied to a tread portion of a high-performance tire requiring a stably high-speed running property. Since such a rubber composition is excellent in the processability, when it is used in the high-performance tire, the wet gripping property, wear resistance, durability and the like are considerably improved.

The following examples are given in illustration of the invention and are not intended as limitations thereof.

EXAMPLE 1

A rubber composition for a tire is prepared as follows.

<Preparation of Solution-Polymerized SBR(a)>

Into an autoclave of 40 L are charged 16 L of cyclohexane, 2.9 kg of 1,3-butadiene and 1.1 kg of styrene and 200 g of tetrahydrofuran is added, and thereafter a polymerization temperature is adjusted to 70° C. and 24 mmol of tetramethylene-1,4-dilithium is added to conduct the polymerization. After the completion of the polymerization, 24 mmol of dimethyl dichlorosilane is added as a coupling agent to obtain a polymer. To 100 parts by mass of the polymer are added 0.5 part by mass of di-tert-butyl-p-cresol and 37.5 parts by mass of an oil extender (aromatic oil) and dried to obtain a solution-polymerized SBR(a).

A mass average molecular weight of the thus obtained solution-polymerized SBR(a) is measured by a GPC analytical method using HLC8020 (column GMHX×2) made by Toso Co., Ltd. The measured value is 1,500,000.

<Preparation of Rubber Composition>

A rubber composition is prepared by the following method according to a compounding recipe shown in Table 1.

The rubber composition is prepared at two stages of a master batch compounding step and a finish compounding step using a Banbury mixer.

In the master batch compounding step, 70% of the total amount of each of the filler and the softening agent is charged in a master batch #1 and the remaining 30% of the total amount is charged in a master batch #2 (two division charging). Thereafter, the finish compounding is carried out by adding a vulcanizing agent and the like.

In the diene rubber component (solution-polymerized SBR (a)), the softening agent (aromatic oil) is previously compounded in an amount of 37.5 parts by mass based on 100 parts by mass of the solution-polymerized SBR(a). On the other hand, the amount of the filler based on 100 parts by mass of the solution-polymerized SBR(a) is 150.0 parts by mass (C/B: 20.0 parts by mass, silica: 100.0 parts by mass, aluminum hydroxide: 30.0 parts by mass), while the amount of the softening agent (aromatic oil) in the master batch compounding is 82.5 parts by mass. Therefore, the amount of the softening agent (37.5+82.5=120.0 parts by mass) to the amount of the filler (150.0 parts by mass) is 80% by mass.

EXAMPLE 2

A rubber composition is prepared in the same manner as in Example 1 except that the amount of the filler based on 100 parts by mass of the solution-polymerized SBR(a) is 300.0 parts by mass (C/B: 50.0 parts by mass, silica: 170.0 parts by mass, aluminum hydroxide: 80.0 parts by mass), and the amount of the softening agent (aromatic oil) compounded in the master batch is 202.5 parts by mass, and the amount of the silane coupling agent is 17.0 parts by mass and the amount of sulfur is 2.5 parts by mass as shown in Table 1. Even in this example, the amount of the softening agent (37.5+202.5=240.0 parts by mass) to the amount of the filler (300.0 parts by mass) is 80% by mass.

EXAMPLE 3

A rubber composition is prepared in the same manner as in Example 1 except that the amount of the filler based on 100 parts by mass of the solution-polymerized SBR(a) is 300.0 parts by mass (C/B: 20 parts by mass, silica: 250 parts by mass and Al: 30 parts by mass), and the amount of the softening agent (aromatic oil) compounded in the master batch is 202.5 parts by mass, and the amount of the silane coupling agent is 25.0 parts by mass and the amount of sulfur is 2.5 parts by mass as shown in Table 1, and further 60% of each amount of the filler and the softening agent is charged in a master batch #1 and 30% of each amount is charged in a master batch #2 and the remaining 10% of each amount is charged in a master batch #3. Even in this example, the amount of the softening agent (37.5+202.5=240.0 parts by mass) to the amount of the filler (300.0 parts by mass) is 80% by mass.

COMPARATIVE EXAMPLE 1

A rubber composition is prepared in the same manner as in Example 1 except that the filler and the softening agent are charged at once without division of the charging.

COMPARATIVE EXAMPLE 2

A rubber composition is prepared in the same manner as in Example 1 except that SBR having a mass average molecular weight of 900,000 (Tufden 3330, made by Asahi Chemical Industry Co., Ltd.) is used as the solution-polymerized SBR as shown in Table 1.

COMPARATIVE EXAMPLE 3

A rubber composition is prepared in the same manner as in Example 1 except that the amount of the filler is C/B: 50.0 parts by mass, silica: 20.0 parts by mass and aluminum hydroxide: 80.0 parts by mass and the amount of the silane coupling agent is 2.0 parts by mass as shown in Table 1 and the filler and the softening agent are charged at once without division of the charging likewise Comparative Example 1.

COMPARATIVE EXAMPLE 4

A rubber composition is prepared in the same manner as in Example 1 except that the amount of the softening agent (aromatic oil) is 37.5 parts by mass and the amount of sulfur is 1.5 parts by mass as shown in Table 1. In this case, the amount of the softening agent (37.5+37.5=75.0 parts by mass) to the amount of the filler (150.0 parts by mass) is 50% by mass.

COMPARATIVE EXAMPLE 5

A rubber composition is prepared in the same manner as in Example 3 except that the amount of the filler is C/B: 60.0 parts by mass, silica: 150.0 parts by mass and aluminum hydroxide: 90 parts by mass and the amount of the silane coupling agent is 15.0 parts by mass as shown in Table 1. In this case, the amount of the softening agent (37.5+202.5=240.0 parts by mass) to the amount of the filler (300.0 parts by mass) is 80% by mass.

<Vulcanization>

Each of the rubber compositions of Examples 1-3 and Comparative Examples 1-5 is vulcanized at 145° C. for 45 minutes to prepare a vulcanized rubber specimen.

<Evaluation>

The processability of the uncured rubber before vulcanization and the properties of the vulcanized rubber are measured as follows. The results are shown in Table 1.

<Processability of Uncured Rubber>

In the milling in a Banbury mixer, the cohesiveness of rubber in the discharge of the rubber composition from the mixer, degree of adhesion to rotor and case in the mixer, and the cohesiveness in the shaping of the discharged rubber composition into a sheet through sheeter rolls and degree of adhesion to the roll and properties of the sheet (states of end portion and skin) are evaluated by the following standards.

◎: no adhesion to inside of the mixed and roll, good cohesiveness in the discharge, and good sheet properties ○: somewhat adhesion to inside of the mixer, and good sheet properties Δ: adhesion to inside of the mixer and the roll, poor cohesiveness of rubber in the discharge, and disorder of sheet end portion X: violent adhesion to inside of the mixer and the roll, or poor cohesiveness of rubber, and poor sheet properties <Wet Gripping Property>

A resistance value of the vulcanized rubber specimen is measured on a wet concrete road surface by using a British portable skid tester. The value is represented by an index on the basis that Comparative Example 1 is 100, in which the larger the index value, the larger the resistance value, the better wet gripping property.

<Wear Resistance>

The volume loss of each compounded mass is measured by using a Lamborn testing machine made by Iwamoto Seisakusho Co., Ltd. under conditions that a load is 2 kg, a slip ratio is 20%, an amount of sand dropped is 20 g/min and a time is 5 minutes, and represented by an index on the basis that a loss amount of Comparative Example 1 is 100 according to the following calculation equation (III), in which the larger the index value, the better the wear resistance.

Wearing index=loss amount of Comparative Example 1/loss amount of each compounded mass×100    (III)

TABLE 1

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Solution-polymerized SBR | SBR(a), MW150000 | 137.5 | 137.5 | 137.5 | 137.5 | — | 137.5 | 137.5 | 137.5 |
| | SBR*1, MW900000 | — | — | — | — | 137.5 | — | — | — |
| Filler | Carbon black N110*2 | 20.0 | 50.0 | 20.0 | 20.0 | 20.0 | 50.0 | 20.0 | 60.0 |
| | Silica*3 | 100.0 | 170.0 | 250.0 | 100.0 | 100.0 | 20.0 | 100.0 | 150.0 |
| | Aluminum hydroxide*4 | 30.0 | 80.0 | 30.0 | 30.0 | 30.0 | 80.0 | 30.0 | 90.0 |
| Softening agent | Aromatic oil | 82.5 | 202.5 | 202.5 | 82.5 | 82.5 | 82.5 | 37.5 | 202.5 |
| Silane coupling agent*5 | | 10.0 | 17.0 | 25.0 | 10.0 | 10.0 | 2.0 | 10.0 | 15.0 |
| Stearic acid | | 3.0 | 3.0 | 3.0 | 3.0 | 3.0 | 3.0 | 3.0 | 3.0 |
| Zinc oxide | | 2.0 | 2.0 | 2.0 | 2.0 | 2.0 | 2.0 | 2.0 | 2.0 |
| Antioxidant 6C *6 | | 2.0 | 2.0 | 2.0 | 2.0 | 2.0 | 2.0 | 2.0 | 2.0 |
| Vulcanization accelerator | DPG | 2.0 | 2.0 | 2.0 | 2.0 | 2.0 | 2.0 | 2.0 | 2.0 |
| | CZ | 3.0 | 3.0 | 3.0 | 3.0 | 3.0 | 3.0 | 3.0 | 3.0 |
| Sulfur | | 2.0 | 2.5 | 2.5 | 2.0 | 2.0 | 2.0 | 1.5 | 2.5 |
| Total amount of filler | | 150.0 | 300.0 | 300.0 | 150.0 | 150.0 | 150.0 | 150.0 | 300.0 |
| Total amount of softening agent (+375) | | 120.0 | 240.0 | 240.0 | 120.0 | 120.0 | 120.0 | 75.0 | 240.0 |

TABLE 1-continued

|  |  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Total amount of softening agent/ Total amount of filler |  | 0.8 | 0.8 | 0.8 | 0.8 | 0.8 | 0.8 | 0.5 | 0.8 |
| Division number of filler and softening agent |  | 2 | 2 | 3 | 1 | 2 | 1 | 2 | 3 |
| Evaluation | Processability of uncured rubber | ⊚ | ◯ | ⊚ | X | ◯ | ◯ | Δ | ◯ |
|  | Wet gripping property | 101 | 123 | 128 | 100 | 98 | 57 | 92 | 120 |
|  | Wear resistance | 102 | 90 | 95 | 100 | 91 | 93 | 110 | 85 |

*1: Tufden 3330, made by Asahi Chemical Industry Co., Ltd. mass average molecular weight: 900,000
*2: Nib, made by Asahi carbon Co., Ltd.
*3: Nipsil AQ, made by Nippon Silica Co., Ltd.
*4: C-301, made by Sumitomo Chemical Co., Ltd.
*5: Si69, made by Degussa
*6: N-(1,3-dimethylbutyl)-N-phenylene diamine In Example 1 of charging the given amounts of the filler and the softening agent in fractions, the processability of the uncured rubber is very good and the wet gripping property and the wear resistance can be improved as compared with Comparative Example 1 having the same compounding recipe.

Example 2 is a case that the total amount of the filler is the same as in Comparative Example 5, but the compounding amounts of C/B, silica and aluminum hydroxide are different and the charging is divided into two fractions. The processability is good and the wet gripping property is excellent. The wear resistance is low as compared with Comparative example 1, but is considered to be favorable looking overall as compared with the other examples. The wear resistance is good as compared with Comparative Example 5.

Example 3 is a case that the total compounding amount of the filler is the same as in Comparative Example 5 but the amounts of C/B, silica and aluminum hydroxide are different and the charging is divided three fractions likewise Comparative Example 5. The processability is very good and the wet gripping property is considerably excellent. The wear resistance is low as compared with Comparative Example 1 likewise Example 2, but is considered to be favorable looking overall. The processability, wet gripping property and wear resistance are good as compared with Comparative Example 5.

Comparative Example 1 is a control for the other comparative examples and the examples. The compounding recipe is the same as in Example 1 using the high molecular weight solution-polymerized SBR, but the filler and the softening agent are charged at once. Therefore, the processability of the uncured rubber is considerably poor as compared with Example 1.

Comparative Example 2 is a case that the solution-polymerized SBR having a mass average molecular weight of 900,000 is used and the filler and the softening agent are charged in two fractions. The processability is good as compared with Comparative Example 1, but the wear resistance is poor as compared with Example 1 because the mass average molecular weight is low.

Comparative Example 3 is a case that although the high molecular weight solution-polymerized SBR is used, the amount of silica compounded is changed in the filler of Example 1 and the filler and the softening agent are charged at once. The processability is good, but the wear resistance and wet gripping property are poor as compared with Comparative Example 1 because the amount of silica compounded is small.

Comparative Example 4 is a case that although the high molecular weight solution-polymerized SBR is used, the amount of the softening agent is changed and the filler and the softening agent are charged in two fractions. Since the amount of the softening agent compounded is small as compared with Comparative Example 1, the processability is somewhat good, but the wet gripping property is poor, while the processability is poor but the wear resistance is good as compared with Comparative Example 2.

Comparative Example 5 is a case that although the high molecular weight solution-polymerized SBR is used, the amount the compounding amounts of C/B and aluminum hydroxide in Example 3 are changed and the filler and the softening agent are charged in three fractions likewise Example 3. Since the compounding amount of silica large as compared with Comparative Example 1, the processability somewhat good, but the wear resistance is poor because the compounding amounts of C/B and aluminum hydroxide are large.

As mentioned above, in the rubber composition according to the invention, the solution-polymerize SBR having a specified mass average molecular weight is used as a diene rubber component and the ratio of the amount of the softening to the amount of the filler consisting of C/B, silica and inorganic agent and the charging method thereof are defined, so that the good processability can be attained in the compounding of the filler at higher parts by mass, and it is possible to obtain the compounded mass having high wet gripping property and durability.

What is claimed is:

1. A rubber composition for a high-speed running tire comprising a diene rubber component, a filler and a softening agent, in which 190-350 parts by mass of a filler is compounded based on 100 parts by mass of a diene rubber component, and a softening agent is included in an amount of not less than 70% by mass per the filler, and not less than 60% by mass of the diene rubber component is a solution-polymerized styrene-butadiene copolymer rubber having a mass average molecular weight of not less than 1,000,000, and the filler comprises, based on 100 parts by mass of a diene rubber component, 10-30 parts by mass of carbon black, 170-300 parts by mass of silica and 10-80 parts by mass of an inorganic agent represented by the following general formula (I):

$$mM \cdot xSiO_y \cdot zH_2O \qquad (I)$$

(wherein M is at least one metal selected from the group consisting of aluminum, magnesium, titanium and calcium, or an oxide of such a metal or a hydroxide of such a metal, m is a number of 1-5, x is a number of 0-10, y is a number of 2-5 and z is a number of 0-10), wherein each of the filler and the softening agent is charged in at least two fractions when the diene rubber component is mixed with the filler and the softening agent.

2. A rubber composition for a high-speed running tire according to claim 1, wherein a previous charging amount of each of the filler and the softening agent can be made larger than a subsequent charging amount thereof in the divided charging of the filler and the softening agent.

3. A rubber composition for a high-speed running tire according to claim 1, wherein not less than ½ of the total compounding amount of the filler and not less than ½ of the total compounding amount of the softening agent are charged at a first stage in the divided charging of the filler and the softening agent.

4. A rubber composition for a high-speed running tire according to claim 3, wherein the charging amounts of the filler and the softening agent at the first stage are 50-90% by mass of the total compounding amount of the filler and 50-90% by mass of the total compounding amount of the softening agent, respectively.

5. A rubber composition for a high-speed running tire according to claim 1, wherein an amount of silica compounded is 170-250 parts by mass.

6. A rubber composition for a high-speed running tire according to claim 1, wherein an amount of the inorganic agent compounded is 25-70 parts by mass.

7. A rubber composition for a high-speed running tire according to claim 1, wherein the inorganic agent is at least one of alumina hydrate and aluminum hydroxide.

8. A rubber composition for a high-speed running tire according to claim 1, wherein an amount of the softening agent compounded is not less than 80% by mass to the amount of the filler.

9. A rubber composition for a high-speed running tire according to claim 2, wherein not less than ½ of the total compounding amount of the filler and not less than ½ of the total compounding amount of the softening agent are charged at a first stage in the divided charging of the filler and the softening agent.

10. A tire using a rubber composition as claimed in any one of claims 1-7, 8 or 9.

* * * * *